United States Patent [19]

Carter et al.

[11] 4,218,750
[45] Aug. 19, 1980

[54] INCREMENTER WITH COMMON PRECHARGE ENABLE AND CARRY-IN SIGNAL

[75] Inventors: Ernest A. Carter, Austin, Tex.; Anthony E. Kouvoussis, Phoenix, Ariz.

[73] Assignee: Motorola, Inc., Schaumburg, Ill.

[21] Appl. No.: 945,738

[22] Filed: Sep. 25, 1978

[51] Int. Cl.² .................. G06F 7/48; H03K 23/08
[52] U.S. Cl. ..................... 364/770; 235/92 CP; 235/92 LG; 235/92 GT
[58] Field of Search ........... 364/770; 235/92 CP, 235/92 SA, 92 LG, 92 SH, 92 GT; 307/220 R

[56] References Cited

U.S. PATENT DOCUMENTS

| | | | |
|---|---|---|---|
| 3,704,361 | 11/1972 | Patterson | 235/92 CP |
| 3,940,596 | 2/1976 | Paddock | 235/92 LG |
| 3,989,940 | 11/1976 | Kihara | 364/770 |
| 4,075,464 | 2/1978 | Davies, Jr. | 235/92 GT X |

*Primary Examiner*—David H. Malzahn
*Attorney, Agent, or Firm*—Joe E. Barbee

[57] ABSTRACT

A MOSFET incrementer circuit is disclosed which is adapted for use in conjunction with a clocked register for incrementing the binary value stored within the register. Each stage of the register has an input terminal which is used to determine whether or not the binary value stored in the particular stage is to be toggled. Each of the input terminals is precharged to a high level which corresponds to the no-increment mode of operation. After the input terminals are initially precharged, the input terminal of the least significant stage is driven to a low level to perform an increment. A plurality of series-coupled MOSFET devices are controlled according to output signals provided by each of the register stages for selectively coupling the low level present at the input terminal of the least significant stage to the input terminals of subsequent stages. When a low level is presented to the input terminal of a stage of the register, the binary value stored within the particular stage is toggled when the register is clocked, thereby causing the value stored within the register to be incremented. A common signal is used to initially precharge the voltage at each of the input terminals as well as to select an increment operation.

13 Claims, 2 Drawing Figures

INCREMENTER WITH COMMON PRECHARGE ENABLE AND CARRY-IN SIGNAL

CROSS REFERENCE TO RELATED APPLICATIONS

1. "Architecture For Data Processor" invented by George Chamberlin, bearing Ser. No. 946,222, filed on even date herewith and assigned to the same assignee as named herein.
2. "Microprocessor Having Instruction Fetch And Execution Overlap" invented by George Chamberlin, bearing Ser. No. 946,221, filed on even date herewith and assigned to the same assignee as named herein.
3. "Real Time Capture Registers For Data Processor" invented by George Chamberlin, bearing Ser. No. 945,737, filed on even date herewith and assigned to the same assignee as named herein.
4. "Microprocessor Having Multiply/Divide Circuitry" invented by George Chamberlin, bearing Ser. No. 945,736, filed on even date herewith and assigned to the same assignee as named herein.
5. "Bus Driver/Latch With Second Stage Stack Input" invented by Ernest Carter, bearing Ser. No. 945,740, filed on even date herewith and assigned to the same assignee as named herein.

BACKGROUND OF THE INVENTION

1. Field of the Invention

This invention relates generally to digital logic circuits, and more particularly, to a MOSFET incrementer circuit.

2. Description of the Prior Art

Within integrated circuit microprocessors, registers are often provided for storing a digital value. Often a register will have a dedicated purpose, as for implementing a timer or a program counter, which generally requires that the digital value be incremented by one at a periodic rate. Although microprocessors generally contain an arithmetic-logic unit which is capable of adding numbers, a separate incrementer circuit is often provided to increment the digital value in the dedicated register in order to avoid using the arithmetic-logic unit for this purpose. The addition of a separate incrementer circuit allows the arithmetic-logic unit to perform other microprocessor operations simultaneously with the incrementing of the dedicated register.

An example of a prior art MOSFET incrementer circuit may be found in U.S. Pat. No. 4,030,079 "Processor Including Incrementer and Program Register Structure" to Bennett et al and assigned to the assignee of the present invention. Typically the register containing the value to be incremented includes a plurality of bit stages, and the incrementer has a corresponding number of increment stages. During a first clock period, a first clock signal enables a plurality of precharge devices which precharge a plurality of nodes to a positive voltage. During a second clock period, a first node is discharged to ground in order to toggle the least significant bit. A plurality of series connected MOSFET devices are coupled between successive nodes within the incrementer. If the least significant bit is a high level prior to being toggled, then the first series-connected MOSFET device is enabled and the node for the next least significant bit is also discharged, thereby causing the next least significant bit to also be toggled by the incrementer.

Occasionally, a microprocessor must avoid incrementing the contents of the register. This may occur for example when the microprocessor detects an interrupt condition. However, this condition might not be detected until the second portion of the clock period at which time some of the incrementer nodes have already been discharged. Thus, in order to avoid the increment operation, it is necessary to once again charge the incrementer nodes to a positive voltage prior to transferring the result of the incrementer into the register.

In the prior art, control logic generates a first signal for enabling the precharge MOSFET devices to precharge the incrementer nodes, and the control logic generates a second control signal or carry-in for allowing an increment operation to be performed. As the number of conditions which determine whether or not an increment operation will be performed is increased, the complexity of the logic circuitry for determining the first and second control signals correspondingly increases.

SUMMARY OF THE INVENTION

It is an object of the present invention to provide an incrementer for incrementing the digital value in a register which allows the logic circuitry for controlling the incrementer to be simplified.

It is also an object of the present invention to provide an incrementer for incrementing the digital value in a register which allows the increment operation to be inhibited without greatly increasing the complexity of the logic circuitry used to control the incrementer.

It is also an object of the present invention to provide an incrementer which can receive an input digital value and provide an output digital value such that the output digital value is either equal to the input digital value or is equal to the input digital value incremented by one according to whether a control signal is in a first or second logic state, respectively.

In accordance with these and other objects, the present invention relates generally to an incrementer having a plurality of input and output terminals such that an input digital value is received by the plurality of input terminals and an output digital value is provided by the plurality of output terminals. Logic circuitry provides a control signal having first and second logic states. Circuitry responsive to the control signal causes the output digital value to be equal to the input digital value when the control signal is in its first logic state. Other circuitry coupled to the plurality of input terminals and responsive to the control signal causes the output digital value to be equal to the input digital value incremented by one when the control signal is in its second logic state. In a preferred embodiment of the invention, the described incrementer is coupled to a register for periodically and selectively incrementing the value stored by the register.

DESCRIPTION OF THE PREFERRED EMBODIMENT

Figure 1:
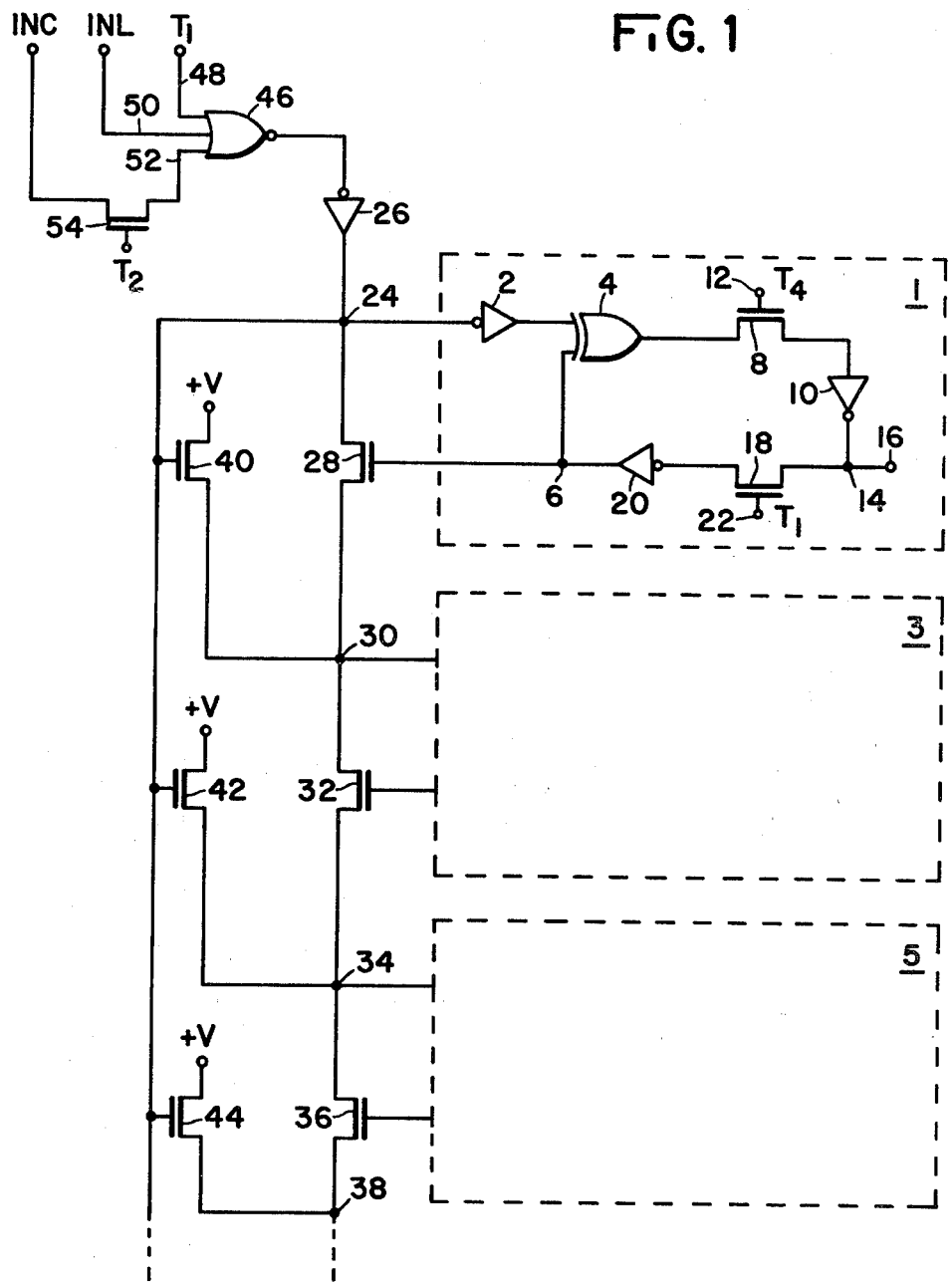
FIG. 1 is circuit/logic diagram of a preferred embodiment of the invention.

In FIG. 1, an incrementer circuit and a clocked register are shown according to a preferred embodiment of the invention. The register is a digital storage circuit consisting of memory stages 1, 3 and 5 and subsequent memory stages (not shown). Memory stages 3 and 5 are shown as dashed blocks, and the circuitry within these blocks is identical to the circuitry shown within block 1. Each of the memory stages has an input terminal and an output terminal, the input terminal corresponding to the input of inverter gate 2 and the output terminal corresponding to node 6 within memory stage 1.

During the following recitation of circuit structure it should be recognized that a MOSFET (metal-oxide semiconductor field effect transistor) is a bilateral active circuit element having two main electrodes, a source and a drain, which are interchangeable, depending on the relative voltages therebetween, and a gate electrode. For a more complete description of MOSFETs, see "Physics and Technology of Semiconductor Devices", A. S. Grove, John Wiley and Sons, Inc., New York, 1967.

The output of inverter gate 2 is coupled to a first input of exclusive-OR gate 4, and a second input of gate 4 is coupled to node 6. As is well-known to those skilled in the art, the output of logic gate 4 is a logic "1" whenever one but not both of its inputs is a logic "1". The output of gate 4 is coupled by MOSFET 8 to the input of inverter gate 10. The gate terminal of MOSFET 8 is coupled by terminal 12 to timing signal $T_4$ such that the output of gate 4 is conductively coupled to the input of gate 10 with signal $T_4$ is at a high level.

The output of inverter gate 10 is coupled to node 14 which in turn is coupled to terminal 16. Terminal 16 may be used for coupling the register to a digital bus such that the complement of the contents of the register can be accessed. Node 14 is coupled by MOSFET 18 to the input of inverter gate 20. The gate terminal of MOSFET 18 is coupled by terminal 22 to timing signal $T_1$ such that node 14 is conductively coupled to the input of gate 20 when signal $T_1$ is at a high level.

It will now be understood by those skilled in the art that a feedback latching circuit has been described within memory stage 1. Assuming that the input to inverter gate 2 is a logic "1", then the output of inverter gate 2 is a logic "0". In this condition, the output of gate 4 has the same logical state as the output of gate 20, i.e., the logic state of the memory stage is not toggled. However, if the input of inverter gate 2 is a logic "0", then the output of gate 4 will be the complement of the output of gate 20, and the logic state of the memory stage will toggle.

The input of inverter gate 2 is coupled to node 24 which is coupled to the output of inverter gate 26. MOSFET 28 is coupled between node 24 and node 30, and node 30 is coupled to the input terminal of memory stage 3. The gate terminal of MOSFET 28 is coupled to node 6 which corresponds to the output terminal of memory stage 1. MOSFET 28 conductively couples node 24 to node 30 when the output of inverter gate 20 is at a high level. MOSFET 32 couples node 30 to node 34, and node 34 corresponds to the input terminal of memory stage 5. The gate terminal of MOSFET 32 is coupled to the output terminal of memory stage 3 such that MOSFET 32 conductively couples node 30 to node 34 when the output terminal of memory stage 3 is at a high level. Similarly, MOSFET 36 couples node 34 to node 38, and node 38 may be coupled to the input terminal of a subsequent memory stage (not shown). The gate terminal of MOSFET 36 is coupled to the output terminal of memory stage 5 such that node 34 is conductively coupled to node 38 when the output terminal of memory stage 5 is at a high level.

Precharge MOSFET device 40 is coupled between a positive supply voltage +V and node 30. The gate terminal of MOSFET device 40 is coupled to node 24 such that the voltage at node 30 is initialized or precharged to a high level when node 24 is at a high level. Similarly, MOSFET devices 42 and 44 are coupled between the positive supply voltage +V and nodes 34 and 38, respectively. The gate terminals of MOSFET devices 42 and 44 are also coupled to node 24 such that nodes 34 and 38 are also precharged to a high level when node 24 is at a high level.

Inverter gate 26 provides a control signal to node 24 for controlling the operation of the incrementer. The input of inverter 26 is coupled to the output of NOR gate 46 which has three inputs. As is well-known in the art, the output of NOR gate 46 is a logic "0" or low level if any of its inputs is a logic "1" or high level. Only when all three inputs are low will the output be high. A first input is coupled by conductor 48 to a timing signal $T_1$. A second input is coupled by conductor 50 to an increment override signal INL, the function of which will be later described. The third input is coupled by conductor 52 to MOSFET device 54 which couples a carry-in or increment signal INC to the third input of NOR gate 46. MOSFET device 54 has its gate terminal coupled to timing signal $T_2$ such that signal INC is conductively coupled to the third input of gate 46 when timing signal $T_2$ is at a high level.

Figure 2:
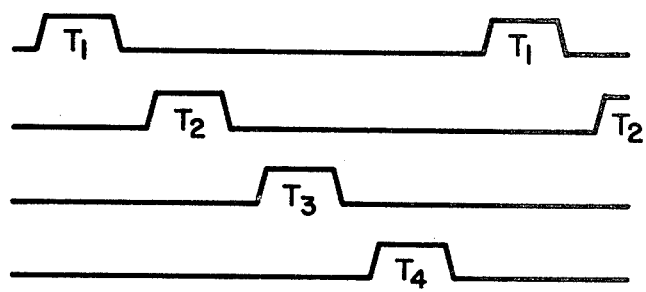
FIG. 2 is a timing diagram showing waveforms for clock signals referred to within FIG. 1.

The operation of the increment circuit will now be described with the aid of the timing waveforms shown in FIG. 2. During the $T_1$ time period, the $T_1$ timing signal is at a high level which forces the output of NOR gate 46 to a low level. The low level output of gate 46 is inverted by gate 26 to generate a high level at node 24. Also during the $T_1$ timing period, MOSFET device 18, within memory stage 1, is operative to couple the logic level at node 14 to the input of inverter gate 20. With node 24 at a high level, precharge MOSFET devices 40, 42 and 44 are enabled for precharging nodes 30, 34 and 38 to a high level. Following the return of timing signals $T_1$ to a low level, timing signal $T_2$ rises to a high level and the increment signal INC is coupled to gate 46. Signal INC is at a low level to indicate an increment operation. Since all three inputs of gate 46 are at a low level, the output of gate 46 is at a high level and node 24 is driven to a low level.

Inverter gate 2 within memory stage 1 outputs a high level to the first input of exlcusive-OR gate 4 such that the output of gate 4 is the complement of the output of inverter gate 20. If the output of memory stage 1, which is the least significant bit of the storage register, is currently a high level or a logic "1", then the gate terminal of coupling MOSFET device 28 is at a high level which allows node 30 to be shorted to node 24 through MOSFET device 28. In this case, the low level established at node 24 causes the precharged high level on node 30 to be discharged to a low level. With node 30 at a low level, the exclusive-OR gate within memory stage 3 (not shown) will also cause the next least significant bit to be toggled. If the output of memory stage 3 is also at a high level, then MOSFET device 32 will be enabled and node 34 will also be discharged to a low level for toggling the logic state latched within memory stage 5. However, if it is assumed that node 6 is currently at a low level, then MOSFET device 28 will be disabled and node 30 will remain at a high level such that the logic state stored within memory stage 3 will not be toggled.

Following the return of timing signal $T_2$ to a low level, timing signal $T_3$ rises to a high level. During this timing period, the increment operation specified by the increment signal INC during timing period $T_2$ can be aborted by raising increment override signal INL to a high level. Such an override feature might be used, for example, when a microprocessor detects an interrupt condition when it may be desired to save the current value of the address register or program counter rather than allowing this value to first be incremented. In this case, signal INL is taken to a high level during timing period $T_3$ which causes a high level to again be established at node 24 and which enables MOSFET devices 40, 42, and 44 for reestablishing high levels on nodes 30, 34 and 38. Finally, during timing period $T_4$ the output of exclusive-OR gate 4 in memory stage 1 is coupled to the input of inverter gate 10 for either repeating or toggling the logic state stored by memory stage 1. Memory stages 3, 5, and subsequent memories stages within the register operate in a similar manner.

Although the invention has been described with regard to the preferred embodiment shown within FIG. 1, it will be obvious to those skilled in the art that the incrementer circuit can be utilized without a register of the type shown in FIG. 1. For example, the incrementer circuit can be viewed as having a plurality of input terminals for receiving an input digital value to be incremented, one of such input terminals corresponding to node 6 for receiving the least significant bit of the input digital value, and a plurality of output terminals for providing an output digital value such that the output digital value is either equal to the input digital value or equal to the input digital value incremented by one, one of such output terminals corresponding to the output of exclusive-OR gate 4 for providing the least significant bit of the output digital value.

While the invention has been described with reference to a preferred embodiment, the description is for illustrative purposes and is not to be construed as limiting the scope of the invention. Various modifications and changes may occur to those skilled in the art without departing from the true spirit and scope of the invention as defined by the appended claims.

What is claimed is:

1. An incrementer for selectively incrementing by one a digital value stored within a digital storage circuit, the digital storage circuit including first and second input terminals and at least one output terminal, said incrementer comprising:
   (a) first means having a control terminal, said first means being for generating a control signal at the control terminal, the control signal being of a first or a second voltage, the control terminal being directly connected to the first input terminal,
   (b) second means directly connected to the control terminal of said first means and coupled to the second input terminal, said second means being responsive to the control signal for initializing a first input potential at the second input terminal, and
   (c) third means directly connected to the first input terminal and coupled to the second input terminal, said third means being responsive to the control signal and being responsive to an output signal generated by the at least one output terminal of said digital storage circuit for selectively establishing a second input potential at the second input terminal.

2. An incrementer as recited in claim 1 wherein said third means includes a MOSFET device having source, drain, and gate electrodes, the source and drain being coupled to the first and second input terminals, respectively, and the gate being coupled to the at least one output terminal.

3. An incrementer as recited in claim 2 wherein said second means includes a MOSFET device having a gate electrode directly connected to the control terminal and a source electrode coupled to the second input terminal.

4. An incrementer for incrementing by one a digital value stored within a digital storage circuit, the digital storage circuit including a plurality of memory stages, each of the memory stages including an input terminal and an output terminal, said incrementer comprising:
   (a) a first coupling MOSFET device having source, drain, and gate terminals, the drain being directly connected to an input terminal of a first memory stage, the source being coupled to an input terminal of a second memory stage, and the gate being coupled to an output terminal of the first memory stage,
   (b) a first precharge MOSFET device for initializing a voltage at the input terminal of the second memory stage, said first precharge MOSFET device having source, drain, and gate terminals, the drain being coupled to a voltage supply terminal, and the source being coupled to the source of said first coupling MOSFET device, and
   (c) means for selectively enabling said incrementer, said means including an output terminal directly connected to the drain of said first coupling MOSFET device and directly connected to the gate of said first precharge MOSFET device.

5. An incrementer as recited in claim 4 further comprising:
   (a) a second coupling MOSFET device having source, drain, and gate terminals, the drain being coupled to the source of said first coupling MOSFET device, the source being coupled to an input terminal of a third memory stage, and the gate being coupled to an output terminal of the second memory stage, and
   (b) a second precharge MOSFET device for initializing a voltage at the input terminal of the third memory stage, said second precharge MOSFET device having source, drain, and gate terminals, the drain being coupled to the voltage supply terminal, the source being coupled to the source of said second coupling MOSFET device, and the gate being coupled to the output terminal of said selective enabling means.

6. An incrementer as recited in claim 4 wherein said selective enabling means comprises logic circuitry having a plurality of input terminals for receiving a corresponding plurality of input signals, said logic circuitry being responsive to said plurality of input signals for establishing a voltage at the output terminal of said means.

7. An incrementer as recited in claim 6 wherein one of the plurality of input signals is a first periodic timing signal, said logic circuitry being responsive to the first periodic timing signal for causing the voltage at each input terminal of each memory stage to be initialized upon each occurrence of the first periodic timing signal.

8. An incrementer as recited in claim 7 wherein a second of the plurality of input signals is an increment control signal having first and second logic states, said logic circuitry being responsive to the first logic state for disabling said incrementer from incrementing the digital value stored in the digital storage circuit and being responsive to the second logic state for enabling said incrementer.

9. An incrementer as recited in claim 8 wherein a third of the plurality of input signals is an override signal for overriding the increment control signal and for disabling the incrementer from incrementing the digital value stored in the digital storage circuit when the increment control signal is in the second logic state.

10. An incrementer for incrementing by one a digital value, the digital value including at least first and second bits, comprising:
 (a) first and second input terminals for receiving the first and second bits;
 (b) first and second nodes;
 (c) first means directly connected to the first node for providing a control signal having a first or a second voltage;
 (d) second means directly connected to the first node and coupled to the second node and being responsive to the control signal for initializing a first potential at the second node;
 (e) third means directly connected to the first node and coupled to the second node and being responsive to the first bit for selectively establishing a second potential at the second node; and
 (f) logic circuitry coupled to the first and second input terminals and coupled to the first and second nodes for providing first and second output bits of an incremented digital value.

11. An incrementer as recited in claim 10 wherein said second means comprises a MOSFET device having a gate electrode directly connected to the first node and a source electrode coupled to the second node.

12. An incrementer as recited in claim 10 wherein said third means comprises a MOSFET device having source, drain and gate electrodes, the drain being directly connected to the first node and the source being coupled to the second node, and the gate being coupled to the first input terminal.

13. An incrementer for selectively incrementing a digital value and being adapted to selectively abort a selected increment operation, comprising:
 (a) timing means for effecting first, second, third, and fourth phases of a clock period;
 (b) a digital storage circuit including first and second input terminals and at least one output terminal for providing the digital value to be incremented and for storing the incremented digital value during the fouth phase;
 (c) first means having an increment select input, an increment abort input and a control output, the control output being coupled to the first input terminal, the first means being responsive to the timing means for establishing a first voltage at the control output during the first phase, the first means being responsive to the increment select input for selectively establishing a second voltage at the control output during the second phase, and the first means being responsive to the increment abort input for selectively returning the voltage at the control output to the first voltage during the third phase;
 (d) second means coupled to the control output of the first means and coupled to the second input terminal of the digital storage circuit, the second means establishing a first input potential at the second input terminal when the control output is at the first voltage; and
 (e) third means coupled to the first and second input terminals of the storage circuit and being responsive to an output signal generated by the at least one output terminal of the digital storage circuit for selectively establishing a second input potential at the second input terminal when the control output is at the second voltage.

* * * * *